Dec. 25, 1945.  B. B. LEVY  2,391,579
TIRE
Filed Oct. 29, 1942
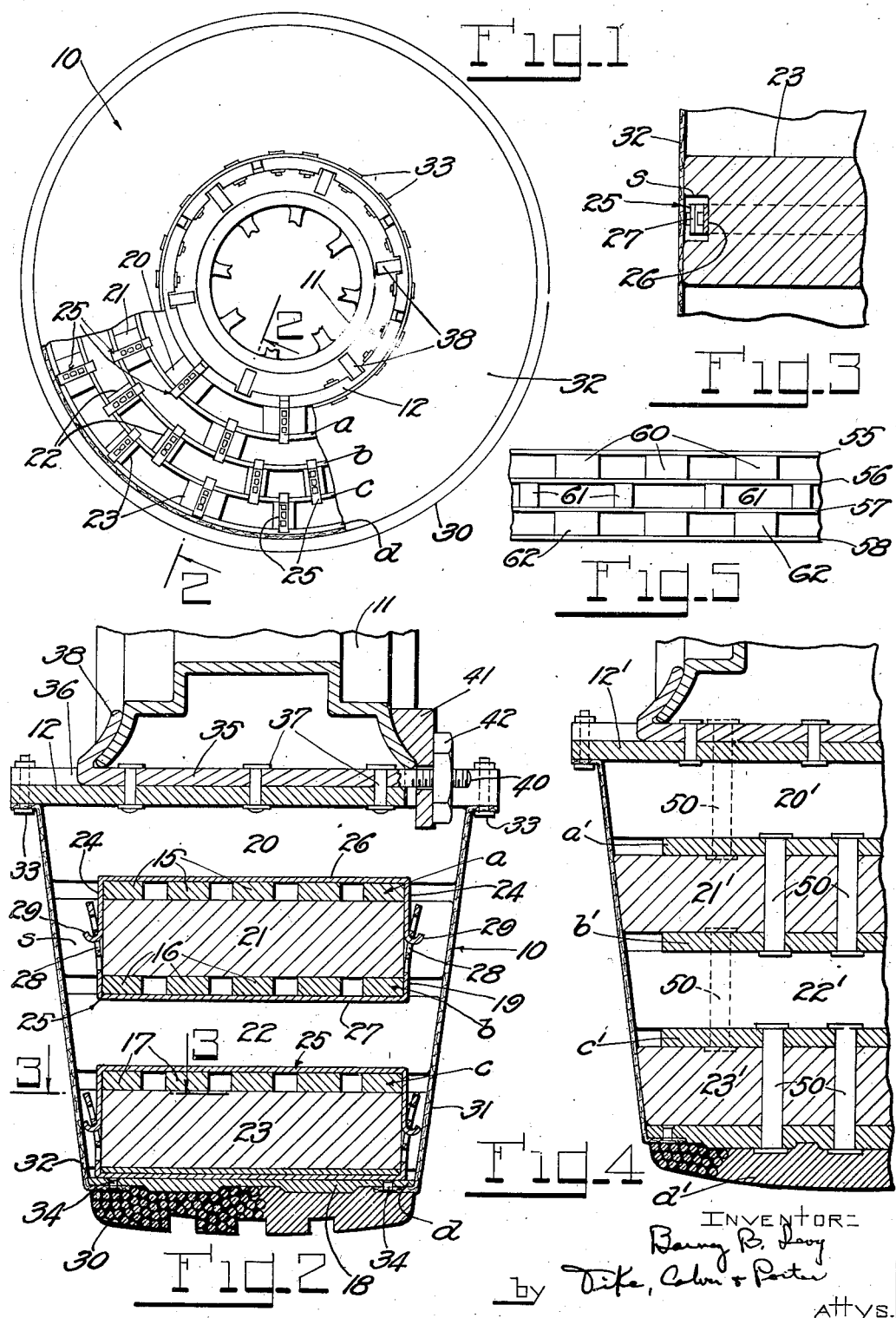

Patented Dec. 25, 1945

2,391,579

UNITED STATES PATENT OFFICE 2,391,579

TIRE

Barney B. Levy, Middleboro, Mass.

Application October 29, 1942, Serial No. 463,729

2 Claims. (Cl. 152—252)

My invention relates to tires for vehicle wheels and has for an object the provision of a tire which can replace a pneumatic tire and yet provide ample resiliency which is substantially uniform at all times as the wheel rotates. While my invention is directed specifically to resilient tires for vehicles, the means employed for obtaining resiliency in the body of the tire is applicable broadly to other articles, such as bed springs or resilient supports on which machinery may be mounted to reduce vibration.

I am aware that various types of resilient wheels have been proposed with the view of dispensing with pneumatic tires. These resilient wheels were designed to replace the entire vehicle wheel upon which a pneumatic tire is mounted. My invention differs from such proposals by the provision of a resilient tire which can be mounted upon a vehicle wheel in place of a pneumatic tire and without change in the construction of the vehicle wheel. Thus, the resilient tire of the invention has substantially the same dimensions as the pneumatic tire which it is designed to replace and may be detachably mounted upon the same vehicle wheel.

These and other features of the invention will be more clearly understood from the following description in conjunction with the accompanying drawing, in which, Fig. 1 is an elevational view, partly broken away, of a vehicle tire embodying the invention mounted upon a vehicle wheel;

Fig. 2 is a sectional view taken upon the line 2—2 of Fig. 1;

Fig. 3 is a detail fragmentary view of a portion of the tire;

Fig. 4 is a fragmentary sectional view similar to Fig. 2 showing a modified construction; and Fig. 5 is a fragmentary elevational view of a resilient body embodying the invention.

As illustrated in the accompanying drawing, a vehicle tire 10 embodying the invention is shown mounted upon the periphery of a vehicle wheel 11. The tire 10 comprises an inner ring-like support 12 adapted to fit upon the periphery of the wheel 11. The support 12 may be made of any suitable material, such as wood or steel. A plurality of spaced concentric radially resilient means $a$, $b$, $c$ and $d$ are mounted concentric with and in spaced relation to the support 12. As shown in Fig. 2 the radially resilient means $a$, $b$ and $c$ each comprises a plurality of axially aligned rings of the same diameter made either of wood or steel. Thus, the resilient means $a$ comprises a plurality of rings 15, the means $b$ comprises a plurality of rings 16 and the means $c$ comprises a plurality of rings 17. The means $d$ comprises a single ring 18.

A series of spaced blocks 20 are interposed between the support 12 and the rings 15. Another series of spaced blocks 21 are interposed between the rings 15 and rings 16. And likewise a series of spaced blocks 22 and 23 are interposed between the rings 16 and 17 and the ring 17 and ring 18, respectively. The blocks 20, 21, 22 and 23 serve to hold the resilient means $a$, $b$, $c$ and $d$ in spaced relation from one another and from the support 12. These blocks may be of any suitable material, such as wood or rubber, and each adjacent series thereof are positioned in radially staggered relation so as to obtain substantially uniform radial resiliency around the tire. Thus, each adjacent series of spaced blocks engage circumferentially spaced portions of the radially resilient means positioned therebetween, as illustrated in Fig. 1.

Each of the blocks 20, 21, 22 and 23 are secured to the adjacent resilient means which they engage so as to prevent circumferential or transverse displacement. As illustrated in Figs. 1, 2 and 3 a clamp 25 is employed for this purpose. Each of the clamps 25 comprises a pair of U-shaped members 26 and 27. The parallel arms 19 of the member 27 are provided with apertures 28 adapted to receive the hook-shaped end portion 29 of the parallel arms 24 of the member 26. The clamping members 26 and 27 engage the remote surfaces of the adjacent radially resilient means and the parallel arms 19 and 24 thereof extend into the radial slot $s$ in the edges of the blocks.

The outermost resilient means $d$ is provided with an outer wear resisting tread 30. This tread, preferably, is formed by winding rubber impregnated cord circumferentially of the tire, in much the same manner as a bobbin is wound, and then vulcanizing to provide an integral tread surface. The side walls of the tire may be enclosed by annular members 31 and 32 which are secured at their inner edges to the support 12 by bolts 33 and are suitably secured at their outer edges to the resilient member $d$ as indicated at 34. The members 31 and 32 may be of any suitable material, such as fabric or other resilient material.

The tire 10 is detachably secured upon the vehicle wheel 11. For this purpose a special clamping structure is provided. Thus, a plurality of circumferentially spaced bars 35 are secured in grooves 36 in the inner surface of the support 12 by rivets 37. One end of each bar 35 is provided with a fixed clamping member 38 adapted to engage one face of the wheel 11. The other end of each bar 35 is provided with a threaded portion 40 adapted to receive an apertured clamping lug 41 which is adapted to engage the opposite face of the wheel 11 and be secured thereagainst by a nut 42 threaded on the portion 40.

In the modification illustrated in Fig. 4 the radially resilient means $a'$, $b'$, $c'$ and $d'$, which correspond to the resilient means $a$, $b$, $c$ and $d$, respectively, of the construction illustrated in Figs. 1 and 2, each comprises a single ring. These rings are separated from one another and from the support 12' by blocks 20', 21', 22' and 23' in the same manner as in the construction shown in Figs. 1 and 2. These spacing blocks, however, are secured to the adjacent rings and to the support 12' by rivets 50 instead of the clamping members 25 used for this purpose in the construction shown in Figs. 1 and 2. Otherwise, the construction shown in Fig. 4 is identical to that shown in Figs. 1 and 2.

In Fig. 5 there is illustrated a resilient body construction embodying the invention and which may be used as a bed spring construction. This resilient body comprises a plurality of spring steel strips 55, 56, 57 and 58 arranged in spaced superimposed relation. A series of spaced blocks 60 are positioned between the strips 55 and 56 and likewise a series of spaced blocks 61 and a series of spaced blocks 62 are positioned between the strips 56 and 57 and between the strips 57 and 58 respectively. Each adjacent series of spaced blocks engage spaced portions of strip positioned therebetween.

I claim:

1. A resilient tire adapted to be mounted as a unitary structure upon the wheel of a vehicle comprising a ring-like support adapted to fit upon a wheel of a vehicle, spaced concentric radially resilient means positioned concentric with said support, a series of spaced blocks between radially resilient means, a series of spaced blocks between the adjacent radially resilient means and between the innermost resilient means and said support to maintain said means spaced from one another and from said support, each adjacent series of blocks engaging circumferentially spaced portions of the radially resilient means positioned therebetween to obtain a substantially uniform radial resiliency throughout the tire, a wear resisting tread carried by the outermost resilient means, and means for detachably securing the resilient tire to said wheel, each of said resilient means between said support and the outermost resilient means including a plurality of radially resilient axially aligned rings of equal diameter.

2. A resilient tire adapted to be mounted as a unitary structure upon the wheel of a vehicle comprising a ring-like support adapted to fit upon the wheel of a vehicle, spaced concentric radially resilient means positioned concentric with said support, a series of spaced blocks between the adjacent radially resilient means and between the innermost resilient means and said support to maintain said resilient means spaced from one another and from said support, each adjacent series of blocks engaging circumferentially spaced portions of the resilient means positioned therebetween to obtain a substantially uniform radial resiliency throughout the tire, a wear resistant tread carried by the outermost resilient means, means for detachably securing the resilient tire to said wheel, and means for securing each of said blocks to the adjacent resilient means engaged thereby including a pair of cooperating U-shaped clamp members adapted to be hooked in clamping relation.

BARNEY B. LEVY.